United States Patent Office 3,167,273
Patented Jan. 26, 1965

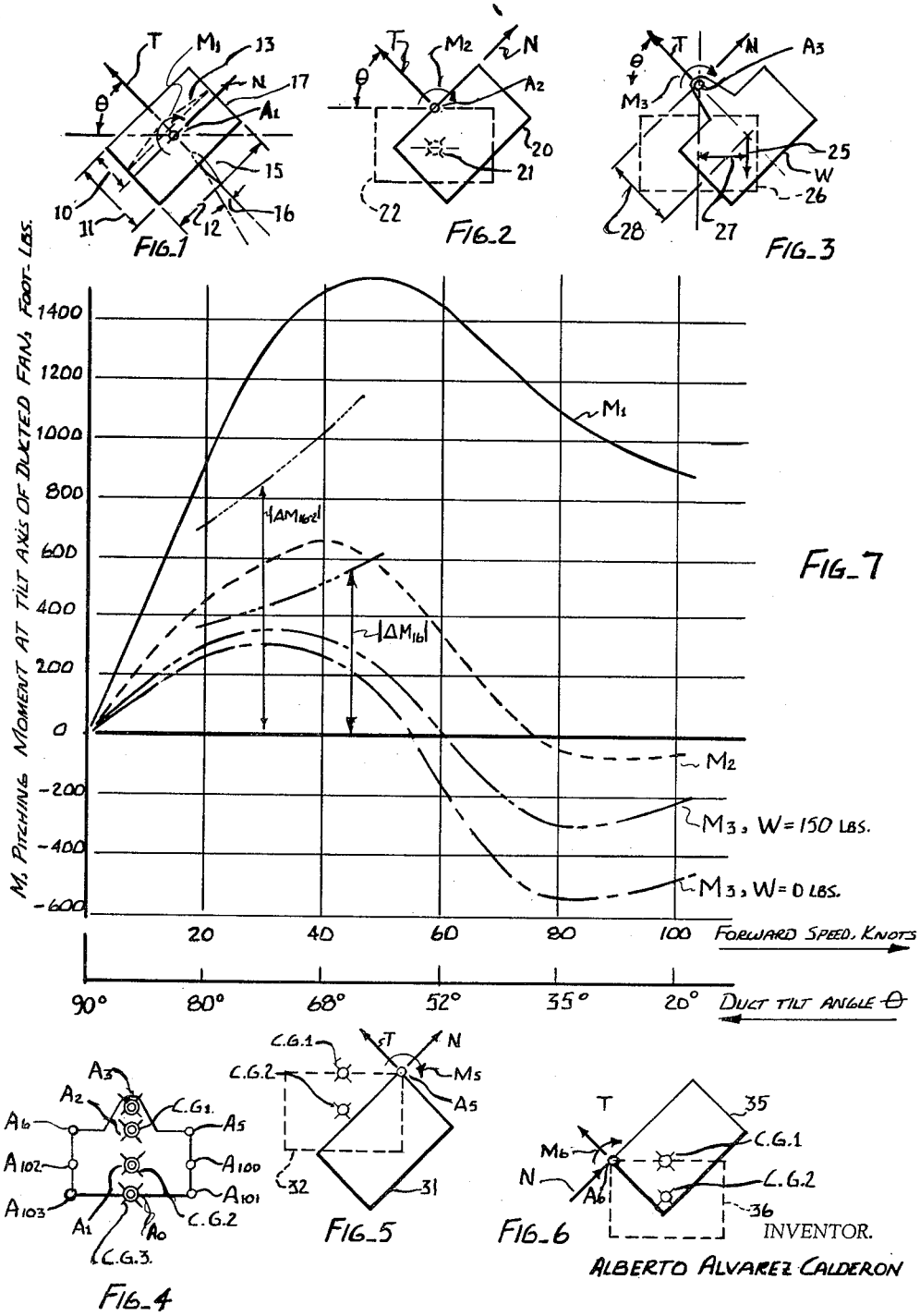

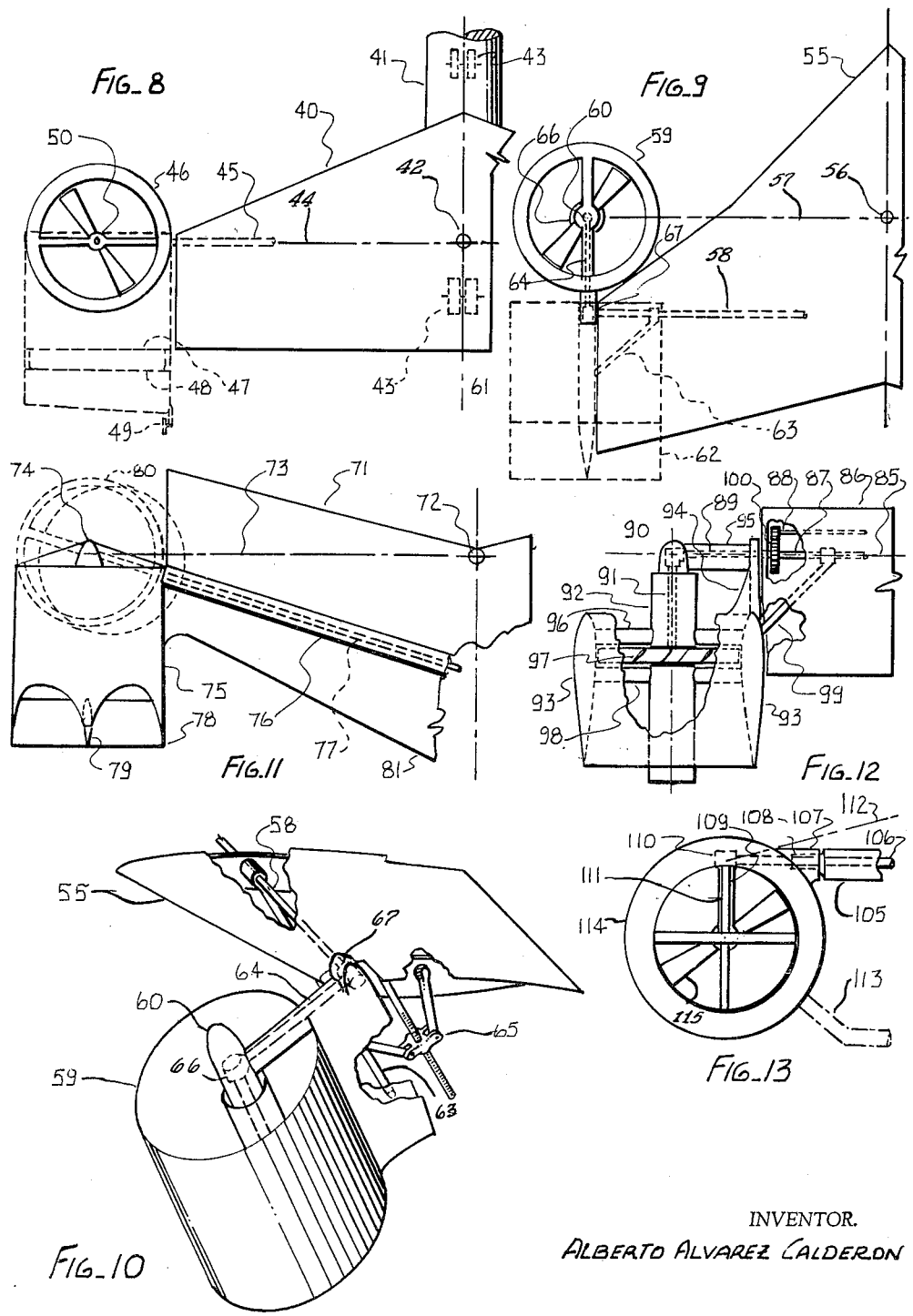

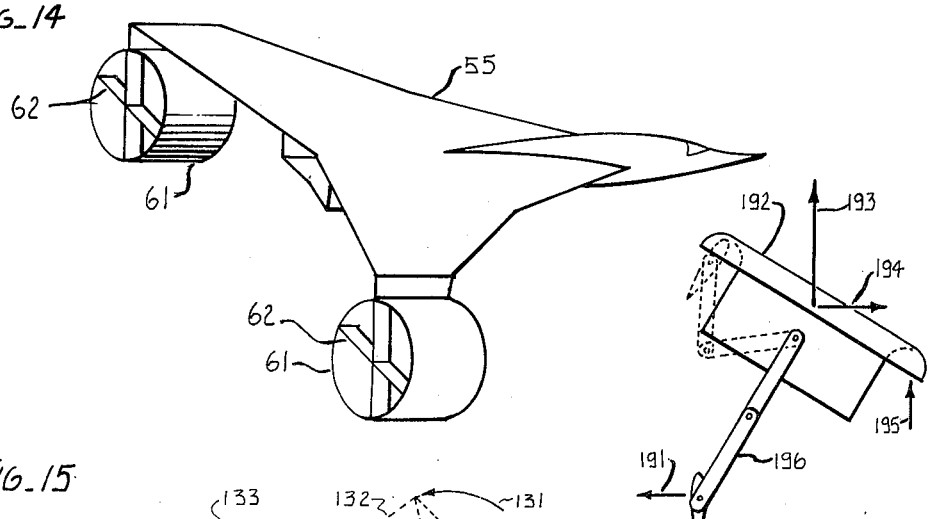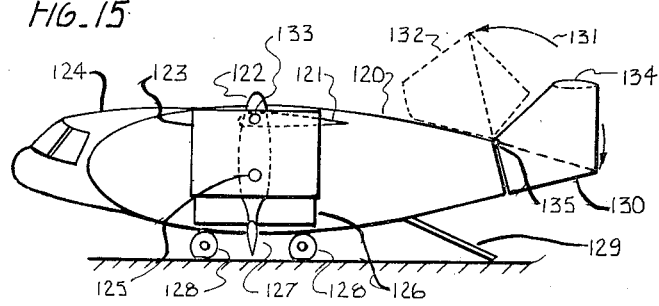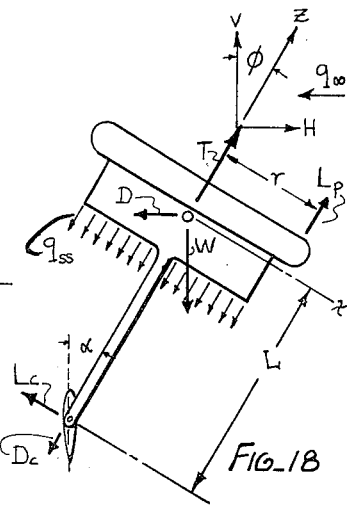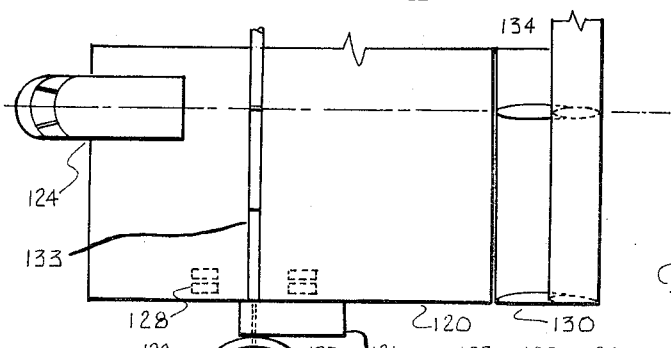

3,167,273
STABILITY AND CONTROL SYSTEM AND APPARATUS FOR DUCTED FAN AIRCRAFT
Alberto Alvarez Calderon, Palo Alto, Calif.
(Av. Salaverry 3465, Orrantia Mar, Lima, Peru)
Filed Apr. 20, 1962, Ser. No. 189,062
13 Claims. (Cl. 244—12)

The present invention is related to aircraft and other vehicles which utilize ducted fans for lift production and for propulsion. More specifically, this invention concerns novel structures and arrangement of tilting ducted fans for vertical and short take off and landing aircraft (VTOL and STOL) which result in improvements of their high speed drag and pitch stability and control characteristics.

It is well known that ducted fans which have their longitudinal axis inclined to the flow are capable of developing extremely large pitching couples and normal forces in addition to their intended thrust forces. Consequently, vehicles as flying platforms, fan-in-wing VTOL aircraft, tilting ducted fan aircraft, and ground effect machines which use ducted propellers, have ducts which when inclined to the relative airflow produce large undesirable pitch disturbance in addition to the production of the intended propulsive and/or lifting forces.

In this application I show structures in which improved tilting ducted fans are mounted on V/STOL aircraft in ingenious and superior arrangements which vastly improve the aerodynamic and structural characteristics of the vehicles, specially in reference to the pitch stability and control characteristics of the vehicles in transition, the high-speed drag characteristics of the vehicle and the wings, and the torsional loads sustained by the ducts and fans.

The embodiments of the invention are illustrated in tilting ducted fan VTOL aircraft, in order to take advantage of published aerodynamic quantitative data. The invention concerns also tilting ducted propellers and similar structures that have a large duct or ring around a relatively large fan or propeller. In this type of propulsive device which has relatively large ducts, the air loads in transition are very large as will be shown later, and therefore there is special need to improve the configurations such as to produce satisfactory structural and aerodynamic characteristics.

Several applications of tilting ducted fans to obtain vertical lift and forward propulsion of VTOL aircraft are known in the art; for instance, see U.S. Patent 2,780,424 of February 5, 1957 or U.S. Patent 2,961,189 of November 22, 1960 by Edmond R. Doak. Such vehicles as proposed in the past are generally characterized in having their tilting ducts connected to the airframe by tilting axis generally perpendicular to the longitudinal axis of the duct and approximately at the middle of the duct. (See for instance, FIG. 3, Patent 2,780,424 and FIG. 4, Patent 2,961,189.) For vertical flight, the ducts are tilted substantially vertically upwards with reference to a horizontal airframe, and the vertical thrust is used to provide vertical flight. In order to have pitch equilibrium in vertical flight, the tilt axis of the duct is located with respect to the airframe such that the fore-and-aft location of the longitudinal axis of duct and therefore of the vertical thrust force vector corresponds to the fore and aft center of gravity location of the aircraft. The center of gravity position is usually located at approximately the quarter chord of the mean aerodynamic chord of the wing. (See, for example, FIGS. 1 and 2 of Patent 2,780,424 and FIG. 3 of Patent 2,961,189.)

It is important to note that the tilt axis of the ducts as proposed in the past are located at approximately the quarter chord of the wing tip. If the wings were swept, then the ducts in the vertical position would lie behind the center of gravity and aerodynamic center of the wing which would be unstable for vertical flight. Therefore the wings are not swept, which is undesirable for speeds near sonic speeds. For transition to forward flight, the ducts are inclined forward from their vertical position and thereby provide a forward thrust component that accelerates the aircraft forward. As forward speed is acquired wing lift is produced; the duct is further inclined forward, and finally, as the vehicle becomes wing-sustained, the ducts are inclined to a substantially horizontal position for high speed propulsion. During this transition maneuver, the fuselage and airframe is intended to remain horizontal, for which purpose large pitch trimming forces have to be applied to trim the adverse pitching moments which result from tilting the duct, and additional control forces are required for controlling the altitude of the trimmed aircraft.

In spite of these adverse pitching characteristics, a tilted ducted fan VTOL aircraft of the general type described above has been built and flown, and full size wings and ducts have been tested in large wind tunnels. One such test, on a full size duplicate of the wing and duct of the Doak VZ-4DA aircraft conducted in the 40 by 80 foot wind tunnel by the NASA and reported in NASA TN D-776 of March 1961, shows that there exists very large positive variations of pitching moments with duct position and forward speed (see FIGS. 8 and 6 of NASA TN D-776 or curve M in my FIG. 7). Now the pitching moments must be zero in equilibrium flight, therefore, during transition large trim forces in addition to the control forces must be provided to the aircraft. These trim and control forces are normally provided by tail jets or tail rotors which are cumbersome and subtract from the power available for lift. In addition, the pitch variations with speed are such as to require large variations of trim force magnitude with speed, which is undesirable. Furthermore, the large pitching couples on the duct are transmitted to the wing; this results in heavy mechanisms to connect the duct to the wing and in a large wing torsional loads and heavy wing sructure.

Additionally, the present ducted fan arrangements make it disadvantageous to use two ducts on the tips of swept back wings or delta airplanes, as that would produce non-equilibrium in hovering. Thus conventional slow speed wing planforms have been used for such vehicles so far.

One more undesirable feature of the existing configurations is the use of a normal airplane horizontal tail, which in transition flight experiences the large variations of downwash angle due to the wing and tilting duct, which further complicates the pitch stability and control problem of the vehicles.

It is therefore evident that considerable difficulties exist in the stability and control problems and structural characteristics of the existing configurations of VTOL using tilting ducts.

An examination by the writer of the characteristics and deficiencies of the tilt duct VTOL vehicle has resulted in new and ingenious arrangements and improvements of tilting ducts VTOL aircraft which are described hereafter in this application. The new structures greatly improve the pitch stability and control characteristics of the vehicle, its structural loads are decreased, and its high speed drag is also improved, new wing planeforms and tailless configurations become possible and advantageous.

It is one object of this invention to provide a new and superior tilting duct structure for a VTOL airframe, whereby the aerodynamic characteristics of the vehicle are greatly improved.

Yet another object of this invention is to have tilting duct to its supporting airframe by a tilt axis adjacent to the forward lips of the ducts.

Yet another object of this invention is to have tilting ducts hinged to wing tips by tilt axis passing adjacent to the lips of the duct and through the center of gravity of the aircraft.

One more object of this invention is to provide improved ducts hraving a greatly reduced pitching moment variations about their tilt axis by having such tilt axis located ahead of the intake lips of the duct.

One more object of this invention is to provide apparatus for a pitch control surface or wing external to and behind my improved tilting ducts, whereby torsion and pitching loads are substantially eliminated.

Yet another object of this invention is to provide improved tilting duct VTOL aircraft which do not have a conventional horizontal stabilizer and elevator, thereby improving their overall performance characteristics and reducing the high speed drag and their size.

One more object of this invention is to provide a high speed swept wing structure which can utilize tip mounted tilting ducted propellers or fans and yet retain a satisfactory location of the duct with respect to the center of gravity of the aircraft for hover pitch stability.

Yet another object of the invention is to provide structure for an improved tilt duct VTOL aircraft which is capable of a very large volume storage capacity.

These as well as other features and objects of this invention will become more apparent by a perusal of the following description of the various embodiments illustrated in the accompanying drawings wherein:

FIGURE 1 shows in a side view the geometric characteristics and direction of loads of a conventional tilting ducted fan; the structure is that tested in NASA TN–D–776 and is shown herein for illustrative purposes and to define aerodynamic loads used in subsequent figures.

FIGURE 2 shows a side view of a ducted fan similar to that of FIGURE 1 but hinged at a tilting axis adjacent to the lips of the duct whereby superior aerodynamic and structural characteristics result.

FIGURE 3 shows a side view of a ducted fan similar to that of FIGURE 2 but hinged at a tilting axis ahead of the duct, whereby vastly improved aerodynamic characteristics result.

FIGURE 4 shows a side view of alternate tilting axes and aircraft center-of-gravity locations of a tilting duct-airframe combination in hover, some of which have superior aerodynamic characteristics as is described in connection to other figures.

FIGURE 5 shows a side view of a ducted fan similar to that of FIGURE 1 but connected to an airframe according to one of the superior arrangements of FIGURE 4.

FIGURE 6 shows a side view of a ducted fan similar to that of FIGURE 1 but connected to an airframe according to another improved arrangement of FIGURE 4.

FIGURE 7 shows the pitching moments about different tilt axis for identical tilting ducts under the action of identical normal and thrust forces; FIGURE 7 shows loads for structures of FIGURES 1, 2, and 3 denoted as curves $M_1$, $M_2$ and $M_3$ respectively.

FIGURE 8 shows a planform view of a ducted fan of the type of FIGURE 2 incorporated into a swept wing of an airplane capable of high speed flight.

FIGURE 9 shows a planform view of a ducted fan of the type of FIGURE 5 incorporated into a delta wing airplane of very high speeds.

FIGURE 10 shows in perspective various mechanisms of a ducted fan of FIGURE 9.

FIGURE 11 shows a planform view of a ducted fan of the type of FIG. 2 on the flap of a swept forward wing.

FIGURE 12 shows a planform view of a ducted fan of the type of FIGURE 3 incorporated to an airplane wing.

FIGURE 13 shows in rear elevation alternate improved connections between a ducted fan and a wing tip.

FIGURE 14 shows in perspective an aircraft with a delta wing planform suitable for supersonic flight incorporating the structures of FIGURES 9 and 12.

FIGURE 15 shows in side elevation a VTOL cargo airplane using my tilting ducts of improved aerodynamic characteristics, and having a tremendous volume storage and loading capacity.

FIGURE 16 shows a partial top view of the aircraft of FIGURE 13 displaying the volume capacity of the fuselage, useful to carry, for instance, assembled helicopters, fighter airplanes or radar antennas.

FIGURE 17 shows in perspective the aircraft of FIGURES 15 and 16 but in high speed flight.

FIGURE 18 shows a side elevation of ducted fan of the flying platform type illustrating a pitch control surface located below and outside the duct. This control surface is of the type shown in earlier figures.

FIGURE 19 shows a side elevation of the structure of FIGURE 18 with the load vectors defined according to this specification.

FIGURE 20 shows a graphic scale discussed in connection to FIGURES 15 and 16.

With initial reference to FIGURE 1, I show a side view of a ducted fan tested by the NASA in combination with a wing; the tests are reported in NASA TN D–776. In this figure as well as in FIGURES 2, 3, 5, 6, and 7 there will be discussed loads on the duct defined and denoted by the following terminology in the drawing.

$T$ = thrust force parallel to the longitudinal axis of the duct and passing through the tilt axis of the duct.

$N$ = Normal force perpendicular to the thrust force and passing through the tilt axis of the duct.

$M$ = pitching moments about the tilt axis of duct, positive for pitch up, clockwise in these figures. Subscript to M indicates figure showing the structure.

$W$ = Weight of the duct.

The axis of tilt of the duct is indicated by the letter A with a subscript used to indicate the figure incorporating the particular structure.

This notation has been adapted to simplify subsequent aerodynamic discussions in which the particular advantages of the structures become evident in terms of loads T, N, M, and W together with a particular axis A and aircraft center of gravity C.G. Since these figures are used to illustrate loads and mass centers, they are drawn indicating the side outline of the duct only, and the proper loads and mass centers.

Specifically FIGURE 1 shows a tilting ducted fan 17 having a fan 13 and a tilting axis $A_1$ (1 denotes FIG. 1). The dimensions of the fan as reported in NASA TN D–776 are: Duct inside diameter 12 is four feet, Duct chord 17 is 33.75 inches, distance 10 from lip of duct to tilt axis is 16.30 inches. The duct has a longitudinal axis which in this case coincides with vector T; the longitudinal axis forms an angle $\theta$ with the horizontal. The duct has a trailing vane in its slipstream denoted as 16.

The loads experienced by the duct and its propeller are denoted as T, N, and M according to the definition stated earlier.

In FIGURE 7, there is plotted from particular tests of NASA TN D–776, a curve of $M_1$ versus forward speed. Also shown are auxiliary coordinate of duct tilt angle $\theta$, and the magnitude variations of moments $|\Delta M_{16}|$ possible by deflecting auxiliary vane 16 in FIGURE 1. The word magnitude is used because 16 may be deflected in either direction, although in the tests it was used only in one direction.

The curve $M_1$ is a reproduction of FIGURE 8 of NASA TN D–776; there is a small difference of nomenclature however, in that FIGURE 8 of NASA TN D–776 is referred to their center of gravity whereas my FIGURE 7 is referred to the tilt axis of the duct. Since the tests of TN D–776 have a center of gravity nearly coincident with the tilt axis of the fan (actually the center of gravity is 1.5″ directly above the center of gravity), the trend of the curves and the values of it are of sufficient accuracy that the curve $M_1$ of my FIGURE 7 does represent very closely the loads on the ducted fan referred to the tilt axis.

I have thus far illustrated a known tilting duct fan configuration and shown the loads acting on it, which as evidenced in curve $M_1$ of FIGURE 7 include a tremendous variation for the pitching moments of the duct during transition.

In the transition tests, for each forward speed value, the tilt angle $\theta$, the power input to the duct, and the magnitudes of the Forces T and N were varied to provide substantial vertical and horizontal equilibrium conditions in the tunnel tests; the tilt axis was substantially coincident with the center of gravity to which the equilibrium conditions were referred. The variations of N and T with forward speed are available in the report of reference.

In the following figures I show the tremendous improvements that can be obtained by (a) Changing the tilt axis of the duct and (b) Changing the relative position of the duct and tilt axis with respect to the center of gravity of the airplane.

These improvements include:

(c) Large reduction of moments about the duct tilt axis which in turn reduce the loads on the duct connections and the torsional stress of the wing.

(d) Vast improvements in pitch stability and control in transition.

(e) The utilization of ducted fans on the tips of wings having planforms suitable for flight under the effects of compressibility.

(f) The omission of conventional tail surfaces, reduction in overall size, weight, and other advantages that will be shown later.

It should be observed in reference to the following figures and especially to FIGURES 2, 3, 5 and 6, that the aerodynamic moments of the structures shown in these figures about their new tilt axis, can be calculated directly from the experimental data available on NASA TN D776. This is done as follows: the magnitude of the loads T, N, and M can be prescribed to be a function of the forward speed only for the given conditions of horizontal and vertical equilibrium as reported in the tests; thence according to the laws of statics, the loads T, N, and M are transferred to new axis of reference which have the new duct tilting axis as the axis of new moments and through which the forces T and N are maintained in direction and magnitude. The resulting new and reduced moments are shown in FIGURE 7 for transition conditions with horizontal and vertical equilibrium as reported in the test. The out-of-trim pitching moments can be seen to be greatly reduced by the new tilt axes of the duct. An example of the transfer equation is included in the description of FIGURE 2.

FIGURE 2 shows in side elevation a tilting ducted fan 20 of the same size as that of FIGURE 1 but hinged at tilt axis $A_2$ at the forward lip of the duct. The figure shows loads T and N identical with T and N of FIGURE 1, new moment $M_2$ and the same tilt angle $\theta$. For vertical flight, the duct is tilted to dashline position 22. The variations of $M_2$ with forward speed and tilt angle are shown as curve $M_2$ in FIGURE 7; it is seen that the pitching moments about the tilt axis of the duct can be reduced by more than one-half by the proper selection of tilt axis. This greatly reduces duct and wing torsional loads. Furthermore, if the tilt axis is made to pass through the center of gravity of the aircraft, the $M_1$ curve represents the ducted fan contribution to the pitching moments of the aircraft and their reduced magnitude greatly improves the pitch characteristics of the aircraft. This is evident also by realizing that with the center of gravity at the duct's tilt axis, both curves $M_1$ and $M_2$ of FIGURE 7 become the moment contribution of the duct to the aircraft pitch stability; evidently curve $M_2$ with its tilt axis through the C.G. position vastly improves the pitch characteristics compared to curve $M_1$. As an alternate location of the center of gravity, there is shown in FIGURE 2 a C.G. position 21. Evidently for vertical flight in which the duct is in position 22 the thrust force acts through the C.G. for pitch equilibrium. I have made separate calculations not included herein which show that as the duct is tilted forward, the variations of pitching moments about the C.G. 21 would result in a curve even more favorable than curve $M_2$ of FIGURE 8.

It is of interest to note that curve $M_2$ can be calculated as follows:

$$M_2 = M_1 + N\frac{(16.3)}{12}$$

where 16.3 is the perpendicular distance in inches from the N force vector of FIGURE 1 and hinge axis $A_2$ of FIGURE 2. Of course, N varies with forward speed but that variation is available in FIGURE 6 of NASA TN D776. Thus curve $M_2$ can be calculated directly from curve $M_1$ according to the above equation. Since T acts through axis of moments by choice, variations of T do not enter the moment equation.

FIGURE 3 shows a side elevation of a tilting duct the same size of that shown in FIGURE 1 but modified to have its tilting axis $A_3$ ahead of the duct. There are shown also the vectors T and N of the same direction and magnitude of FIGURE 1, and new and reduced moment $M_3$. Also shown in same tilt angle $\theta$, the duct in vertical flight position 26, perpendicular distance 28 between hinge axis $A_3$ and the duct center, and horizontal distance 27 between the tilt axis and the weight vector of the ducted fan denoted as W.

The moment variations of the structure of FIGURE 3, with distance 28 equal to two feet, is shown without the effect of the duct weight W, as curve $M_3$, $W=0$ in FIGURE 27. The effect of including a weight $W=150$ lbs. on the moment variations is shown on curve $M_3$, $W=150$ lbs. in FIGURE 7. This effect is purely a gravitational effect and not aerodynamic. It can be seen in FIGURE 7 that the structure of FIGURE 3 results in extraordinary reductions of moment characteristics of the ducted fan about its hinge axis. Further it can be seen by comparing the magnitude of curves $M_3$, with that of curve $M_{16}$ which gives available change of duct moments due to deflection of trailing surface 16 of FIGURE 1, that it is possible to program the position of a trailing surface like surface 16 of FIGURE 1 in the structure of FIGURE 3 such that the hinge moments about the hinge axis of the structure of FIGURE 3 are zero for all forward speed values. Zero moment characteristics are possible because the magnitude of curve $M_3$ is smaller than those of curve $M_{16}$.

If this tilt axis $A_3$ is made to pass through the C.G. of the airplane, then tremendous improvement of pitch stability characteristics result; in that case curves $M_3$ of FIGURE 7 would represent the ducted fan contribution to the pitch stability conditions of the aircraft; evidently using the programmed deflection of surface 16 mentioned in the previous paragraph results in zero pitching moment contribution of the tilted ducting propellers to the aircraft's pitch stability characteristics.

Curves $M_3$ were calculated in a manner similar to curves $M_2$.

I have investigated various combinations of tilt axis and aircraft center of gravity locations for tilting ducted VTOL vehicles. In FIGURE 4, I show in a side view of a vertical tilting ducted fan some of the center of gravity locations studied: $CG_1$, $CG_2$, $CG_3$ and $CG_4$; the duct tilt axis considered are: $A_1$, $A_2$, $A_3$, $A_4$, $A_5$, $A_6$, $A_0$, and other alternate tilt axis $A_{100}$, $A_{101}$, $A_{102}$, and $A_{103}$.

It is known that for vertical flight the resultant duct force acts through the longitudinal axis of the duct; as shown in FIGURE 4 this vertical resultant force passes through the center of gravity locations, thus providing with pitch stability in vertical flight.

For tilt axis locations $A_1$, $A_3$, $A_4$ and $A_5$, the lower the C.G. with respect to the tilt axis the better the pitching moment characteristics will be with forward speed for the transition regime. I have already considered tilt axis $A_1$, $A_2$ and $A_3$ in the earlier figures. Hinge axis $A_6$ and $A_5$ are studied in subsequent figures. FIGURE 5 shows in side view an inclined tilting duct 31 of the same size as that shown in FIGURE 1, having a tilt axis $A_5$ at the upper forward location in the duct lip, and loads T, N and $M_5$. For vertical flight, the duct would be in dash line position 32. Two alternate center of gravity locations are shown as $CG_1$ and $CG_2$. I have made investigations of the general type described in connection to FIGURE 7 but referred to a prescribed center of gravity locations and these investigations show that hinge axis $A_5$ and center of gravity $CG_2$ result in nearly zero duct pitching moments for a duct tilt angle range between 50 and 90 degrees, which is the slow-speed critical range of the system. C.G. 1 of FIGURE 3 also results in greatly improved moment characteristics.

In FIGURE 6 I show a side view of an alternate tilt duct arrangement. Duct 35 is hinged at tilt axis $A_6$ at the lower forward lip of the duct. There are shown loads $M_6$, N and T; also there is shown duct in vertical position 36 in dash lines, and two center of gravity locations $CG_1$ and $CG_2$.

The resulting moment characteristics of the structure of FIGURE 6 are superior to those of FIGURE 1, but aerodynamically not as desirable as those of other earlier figures.

So far, I have shown the effects of new and ingenious tilt axis location on the moment characteristics of ducted fans which serve to greatly decrease duct and wing torsional loads; these new tilt axis locations when related properly to the aircraft's center of gravity location as described, result in vast improvements in the pitch stability and control characteristics of the vehicles.

I will now show in different views in which the improved tilting ducted propellers are installed in winged aircraft. The resulting advantages of the system will be pointed out in the subsequent figures.

FIGURE 8 shows a fragmentary top view of a tilting ducted fan VTOL airplane with a tilt duct arrangement of the type illustrated in FIGURE 2. Specifically, there is shown a central fuselage portion 41 having a left wing 40 with slight sweep back such that its aerodynamic center 42 falls approximately at the same fore and aft location of the forward corner of the wing tip, as shown in the figure. The tilt duct is shown in its vertical position 46 for vertical flight and is pivoted by a tilting axis at the fluid intake lips of the duct. The tilt axis is shown passing through the thrust and impeller axis 50 concentric with duct 46, and through the aerodynamic center 42 of the wing. At the axis 45 there is a spanwise shaft interconnecting the fans of the left wing to that of the right wing. The latter is not shown. The center of gravity of the aircraft should be at or very close to aerodynamic center 42. Thus, in vertical flight, thrust 50 acts at substantially the same fore-and-aft location as the C.G. and produces no pitch disturbance. For transition to forward speed, tilting duct 46 is tilted backwards about axis 45 (see for instance FIGURE 2 for a side view of this type of tilting) to a final horizontal position 47 shown in dash lines. With the C.G. of aircraft of FIGURE 8 at axis 44 the pitching moments about the C.G. during transition will be of the type shown in curve $M_2$ of FIGURE 7; alternately the C.G. may be below axis 44 which would improve the torsional and aerodynamic moment characteristics in transition even more. It should be observed that in order to obtain these advantages the pivotal axis of the duct is located adjacent to the forward corner of the wing tip and ahead of the wing tip quarter chord.

Also shown in FIGURE 8 are a main central landing gear 43 on the fuselage, an auxiliary outrigger landing gear 49 on the tilting duct (shown in the retracted duct position) and an auxiliary trailing surface 48 to the rear of the tilting duct, of the same type as that described in FIGURE 1 but located outside and to the rear of the duct.

It should be observed that the planform of wing of FIGURE 8 is suitable for near sonic speed because of its sweepback, and is superior to an unswept wing. This wing planform also cooperates with the superior tilt axis location for the duct to permit a low drag location for the duct in the horizontal position, with the lips of the ducts adjacent to the wing tip leading edge.

The aircraft of FIGURE 2 may be provided with a conventional tail for high speed pitch stability. Preferably the duct 46 may be provided with its trailing surface 48 away and to the rear of the duct, as explained earlier and as explained also in FIGURE 19 of my application Serial No. 48,038 of August 11, 1961. Such trailing surface can provide high speed stability for the wing without the conventional tail, and eliminate pitching moment contributions of the ducted propeller to the frame supporting it.

I have conducted experiments showing that the structure of the type of control surface 18 of FIGURE 8 in this application, and of surface 190 of FIGURE 19 of this application and of application Serial No. 48,038 also, in which the distance between the duct intake lips and the control surface equals approximately 1.2 times the duct intake diameter, can produce the necessary control moments for the duct's attitude control without any couples between the frame supporting the ducted propeller and the ducted propeller itself. Such attitude control in the absence of couples from the frame supporting the ducted propeller showed experimentally that the pitching couples of the tilt axis were zero, thereby eliminating the pitching moment contribution of the ducted fan to the torsional loads of the supporting frame and to the frame's pitch equilibrium. The function of control surface 18 of FIGURE 8 is clearly explained with the aid of FIGURE 19, which shows a side elevation of a ducted fan or propeller having horizontal translation with its pitch stability and attitude controlled by an aerodynamic surface or small wing located away from the ducted propeller and in its slipstream. In FIGURE 19 such ducted propeller or fan is shown in translation illustrating the motion of a flying platform type of vehicle. Specifically for pitch control a small wing 190 is supported by an arm 196 within the slipstream of the flying platform to provide the appropriate control forces. If, for example, the flying platform 192 is supported by a lifting force represented as vector component 193 and is advancing due to and in the direction of force represented by vector component 194, a lip induced force 195 is present which obviously affects the pitch stability of the platform 192. Through adjustment of the length of arm 196, the pitching moment produced by the lip-induced force 195 can be balanced by wing force 191 so that the flying platform can be maintained in a state of pitch equilibrium during its horizontal movement. Observe that by variations of arm 196, force 191 can be made smaller than force 194 to allow translation in direction of 194, and yet provide pitch equilibrium to lip force 195. When landing or hovering, the arm 196 and cylinder 190 can be withdrawn to the dotted-line disposition.

The control characteristics described in connection with surface 18 and 190 of FIGURES 8 and 19 respectively have been investigated experimentally by this writer. These experiments, performed as a special graduate course at the Mechanical Engineering Department of Stanford University, are described as follows:

PRELIMINARY EXPERIMENTAL INVESTIGATION OF CONTROL SYSTEM FOR DUCTED FAN VEHICLES

*Summary*

An experimental investigation has been conducted on a pitch control system for a ducted fan vehicle tested in a circular-arc constant elevation path with degrees of freedom of horizontal translation along the arc and rotation about the model's pitch axis. The control system comprises a single airfoil surface located at a relatively large distance below the vehicle and in its slipstream to provide small, generally horizontal control forces in a direction opposing that of intended motion. The experiments have shown that for the model tested uniform self-propelled translation at a constant tilt angle is possible up to tilt angles of 45°, and that controlled maneuvers in pitch can be performed. It is suggested that the lip shape of the duct, for a given lip size, should be optimized to minimize undesirable pitch characteristics of the vehicle, and that the additional tests of a more refined model including dynamic similarity and vertical freedom should be performed.

Tilt angles greater than 45° were not tested in steady conditions because of structural limitations of the test rig.

(I) Introduction

Considerable interest has been shown in recent years in VTOL aircraft and GEM that utilize a ducted fan as a means of obtaining lift and propulsion. Several investigations have shown that large, undesirable pitching moments appear on these machines in the presence of forward speed. In an attempt to control the VTOL ducted vehicles in pitch, several devices have been proposed, some of which are:

(1.1) Displacing the C.G. of the machine to obtain (pitch) control. For instance, the original control concept of the Hiller Flying Platform required body-leaning as a means to introduce moments through the ankles of the pilot.

(1.2) Aerodynamic forces by means of surfaces in the slip-stream of the propeller, either ahead or behind the propeller. These surfaces have been subject to practical considerations as far as size and location, and as a result they have usually been placed within the duct, or at a short distance from it. Such surfaces may introduce control forces in a direction contrary to the direction of intended motion, and/or the direction of lift.

(1.3) Vehicles using more than one ducted fan to achieve improvements in the pitch characteristics. Some arrangements are the Tandem duct and the three-duct arrangements. (Ref. NASA TN D-377 and TN D-409.)

(1.4) Variations of other geometrical parameters such as a reduced lip size, which have been used successfully to minimize undesirable pitch characteristics. The power penalties to obtain significant improvements are large by this method.

(1.5) From these investigations it may be observed that the pitching characteristics of these vehicles represent a serious limitation of their successful application to the tasks for which they were originally intended.

During preliminary studies of the pitching characteristics of the ducted fan, it became evident to the writer that some methods of improving and controlling these characteristics had not been investigated. It was therefore decided to conduct a simple, experimental investigation of a Ducted Fan vehicle to test the validity of one of the control systems. The control system selected was the simplest to construct and to test, and is described in the following section of this report.

Summarizing, it falls generally in group 1.2 of this section, and it consists essentially of a single (rather than a plurality) surface of relatively large dimensions, immersed in the slipstream below the duct but at a large distance from it. Its purposes are:

(a) To provide a large, trim couple in pitch by the introduction of a small, generally horizontal force acting against the direction of intended motion.

(b) To provide large pitch control couples in any flight condition.

(II) Theoretical considerations

The presence of momentum drag is an inescapable feature of the ducted fan vehicle, as it is associated with the change of momentum of the relative flow necessary to provide lift. Ultimately this change of momentum has to be created by forces which are supplied by the propeller, the duct, and the control system. For convenience, the change of momentum may be considered as caused by a pressure distribution present in the vehicle, which provides the necessary (centripetal) forces. It is not impossible to consider the general case of an arbitrary ducted fan with a prescribed pressure distribution which would provide a resultant force acting through the center of gravity of the vehicle, with no pitching moments present. However, it has been thought more compatible with this experimental investigation to accept a given severe set of pitch stability characteristics, and to provide a control system capable of achieving pitch trim with forward motion and pitch control of the vehicle in all conditions. The pitch control system is shown diagrammatically in FIGURE 19. The forces shown have been simplified for the purposes of this analysis as follows:

T—thrust of the vehicle in the direction of its longitudinal axis, excluding lip forces
$L_P$—lip aerodynamic force assumed parallel to T and acting at a distance of one propeller radius ahead of T
D—drag of the vehicle in a direction opposite to its horizontal translation
W—weight of the vehicle
$L_C$—control force on control surface in a direction perpendicular to the longitudinal axis of the vehicle
$D_C$—force on control surface colinear with the longitudinal axis of vehicle
L—distance from the center of gravity of the vehicle to the areodynamic center of control surface
r—radius of the propeller and inner radius of lip
$\phi$—tilt angle, measured from the vertical to the longitudinal axis of the vehicle, positive when measured towards the direction of intended motion
$\alpha$—angle between control surface and longitudinal axis of vehicle, measured from said axis and positive as shown in drawing
q—dynamic pressure relative to the vehicle resulting from horizontal translation of the vehicle
$q_{ss}$—dynamic pressure relative to the control surface resulting from thrust production, assumed in direction of longitudinal axis of vehicle Some comments on the assumptions of the definitions are in order: The assumptions are thought to be reasonable, in light of the qualitative nature of the tests, and are useful to describe the over-all static equilibrium of the system in the presence of self-propelled translation—with a constant value of $\phi$ and T—at uniform speed, in a path constrained along a circular arc at constant elevation. The lip force has been isolated and assumed acting parallel to T. In reality this represents only one component of the lip force. Propeller, lip and duct normal forces (in planes parallel to plane of disc) and moments are assumed included as the components of vector system of D and T, acting through the C.G. of the vehicle, and $L_P$. Pitching moments on the control surface are assumed negligible and $q_{ss}$ is assumed large in comparison to q. The axes shown are:

Z axis—a longitudinal axis of the vehicle
X axis—perpendicular to Z axis and through the C.G. of the vehicle
V axis—vertical axis on the vehicle
H axis—horizontal axis on the vehicle With reference to FIGURE 18 we can write the following equilibrium equations:

(2.1) In the horizontal direction (H axis) in the case of uniform translation we can write that the resultant force component in that direction is equal and opposite to the resultant vehicle drag. We have:

(2.2) In the vertical direction we may write the vertical equilibrium equation for the conditions described in 2.1:

$$(T+L_P) \sin \phi = D + L_c \cos \phi'' Dc \sin \phi$$

$$(T+L_P) \cos \phi + Lc \sin \phi = W + Dc \cos \phi$$

(2.3) Finally we write pitch equilibrium equation about the vehicle center of gravity to obtain:

$$L_P r = L_c L$$

(2.4) From 2.3 we can immediately obtain the value of 1, the arm of the control surface $$L = \frac{L_P r}{L_c}$$

(2.5) The value of $L_C$ can be obtained by the simultaneous solutions of 2.1 and 2.2. We may, as an approximation, disregard the term $D_C$ since $D_C$ is small compared to D, T, $L_P$ and $L_C$, and because sin $\phi$ is smaller than cos $\phi$. Hence $L_C$ can be estimated directly from 2.1 to obtain:

$$Lc = \frac{(T+L_P) \sin \phi - D}{\cos \phi}$$

We have thus established the approximate value of the pitch equilibrium control force and its arm distance to the center of gravity in terms of T, D, and $L_P$. These latter quantities can be estimated for a prescribed vehicle, from existing data. The proper dimension and angle of deflection $\alpha$ of the control surface can be estimated by momentum theory from the value of $q_{ss}$ necessary for vertical equilibrium.

(III) *Description of test apparatus*

A ducted fan vehicle was constructed having the general proportions of FIGURE 18. Due to the limited financial investment for the tests, the dimensions of the model were chosen arbitrarily to correspond to the dimensions of stock materials. The duct was constructed from a cylindrical welded steel tube with an inside diameter of 9 inches. The duct lip of circular cross-section was formed by wrapping a flexible aluminum tube of 2.25 inches diameter around the upper section of the tube. Modeling clay was used to obtain a smooth fairing betwen the lip and the duct. A model airplane motor was installed inside the duct, driving a single model airplane propeller. The propeller had unfavorable geometry for use in a duct, and had a tip clearance that varied along the periphery of the duct, with a maximum of about 1/32 of an inch. Clearance was required because of vibration and imperfections in the tube. The control surface had dimensions of 8.75 inches span and 3.5 inches chord. Tip plates of elliptical planform were attached to each end. Airfoil section was approximately NACA 0009. The location of control surfaces was variable, with values of L from 7 inches to 19 inches. Lip spoilers of various sizes were used to supplement control forces. The spoilers were approximately 1/4 inch square section and about 4 inches in length. A rotating arm rig was constructed to allow the model to have self-propelled translation in a circular arc path at constant elevation. The model was suspended at the end of the arm by means of a pivotal hinge which provided freedom in pitch for the model about a pitch axis through its C.G. (Mass balanced about C.G.) The order of magnitude of forces and speeds are Thrust T=3.5 lbs.; peripheral speed along the circular arc up to 15 ft./sec. The control surface was actuated by an electric serve mounted on the vehicle. The time response of the serve was considered slow.

(IV) *Tests*

Tests were commenced in December 1960 and completed in March 1961. The information derived from the tests which is pertinent to this report will be grouped in three categories:

(4.1) Uniform self-propelled translation with a constant value of tilt angle was obtained experimentally for value of L, control moment arm, of 13 inches. Steady values of $\phi$ were possible for a range of $\phi$ from zero to 45° with a corresponding variation of translational speed. For $\phi$ over 45°, speeds became too large for the structural safety of the rig. Because of early stall of the thin control surface in the slipstream, relatively small control forces were available from it, and this in turn necessitated a large value of 1. It is considered that a thicker high lift section for the surface would allow to shorten the value of 1 to its minimum value required for self-propelled horizontal translation. The steady values of $\phi$ were obtained with steady fixed control surface deflection for lower disc loadings (LOW R.P.M.), and with various control applications in the maximum disc loadings (about 3.5 lbs. of thrust). From this experiment it is considered that a satisfactory pitch control system has been obtained for the model in the case of uniform self-propelled translation.

(4.2) Accelerated motions along a circular path with a constrained constant elevation were accomplished with satisfactory control. These motions consisted of initiating, stopping and reversing the uniform translation described in Section 4.1. The slow time response of the servo unit made these maneuvers unduly difficult.

(4.3) A strong effect of the lip flow on the pitch stability of the system was observed. Some geometrical variations included the use of lip spoilers. It is considered that the lip shape, for a given lip size, may be of considerable significance on the pitching characteristics. This consideration therefore implies that there is an optimum lip shape to minimize undesirable pitch characteristics. It is proposed that the optimum pitch stability-and-control lip shape for a lifting ducted propeller with forward speed should be the shape that would be had by a streamline passing at the tip of an ideal propeller acting in ideal flow with certain flow conditions chosen in the ideal flow to simulate some characteristics of the real ducted propeller flow. Some of these conditions are:

(1) An ideal propeller radial blade loading distribution similar to the actual blade loading (2) Slipstream boundary conditions which should include lack of contraction of slipstream behind the actuating disc, but make no specifications of the flow ahead of the actuating disc (3) A specified (variable) ratio of slipstream speed to forward speed and tilt angle The resulting streamlines of the ideal flow described above would show no contraction behind the disc to simulate presence of the lower portion of a duct and would also define, in the three dimensional case, a stream surface determined by a sheet of "flow" from infinity into the circular periphery of the actuating disc. If into that ideal flow there were introduced a duct lip shaped to coincide with the stream surface flowing into the circular periphery of the actuating disc, and if the lip were infinitely thin, then the lip would not contribute any forces to the system since it would not affect the flow for the specified conditions. Therefore such a lip could not introduce any undesirable pitching moments to the system. At the same time, the ideal flow would exhibit lack of contraction behind the slipstream, smooth downward tip flow and a desirable propeller radial load distribution, which are necessary characteristics for high lift efficiency in the real flow.

Although a real lip of the exact shape of the ideal lip would be perhaps impractical to construct, it is thought that a real lip (with perhaps a variable inclination) which would generally follow the ideal shape would result in a significant improvement of the pitch stability and control characteristics for the vehicle utilizing it, without a significant power penalty. In the case of a GEM with a horizontal ducted fan, such a lip would minimize the fore-and-aft variations of planform loading which would normally be adscribed to the variations of forces with forward speed on a standard lip of the duct around the propeller.

(4.4) Another method to provide pitch control in the presence of forward speed would be to introduce an aerodynamic surface capable of extremely high lift coefficients to provide useful control forces based on relative dynamic pressure of translation.

(V) Conclusion

An experimental investigation has been conducted on a pitch control system for a ducted fan vehicle tested in a circular-arc constant elevation path with degrees of freedom of horizontal translation along the arc and rotation about its pitch axis. The control system comprises a single airfoil surface located at a relatively large distance below the vehicle and in its slipstream to provide small, generally horizontal control forces in a direction opposing that of intended motion. The experiments have shown that for the model tested, uniform self-propelled translation at a constant tilt angle is possible up to tilt angles of 45°, and that controlled maneuvers in pitch can be performed. It is suggested that the lip shape of the duct, for a given lip size, should be optimized to minimize undersirable pitch characteristics of the vehicle.

It is of importance to indicate the practical applications of the experiments described above in connection to the improved ducted fans of the invention.

We first consider the tilting ducted fan as a free body like a flying platform. The experiments have shown that sufficient pitching couples for pitch trim and for pitch control can be provided for conventional type of tilting ducted fan structure (say similar to that of FIG. 1) by means of a small wing or surface located at a sufficiently large distance to the rear of the duct and in its slipstream. By virtue of the long moment arm of the control surface in reference to the duct, large improvements in trim and control forces are possible in the presence of self-sustained horizontal translation. It is important to realize that if the distance between the duct and the pitch control surface is decreased, for example from that shown in FIG. 19 to that of FIG. 1, obviously the force developed by the control surface which acts in a direction opposing motion has to be augmented. For instance, if arm 196 of FIGURE 19 where halved, vector 191 would have to be doubled to retain pitch equilibrium. In that case, the net horizontal force in direction of horizontal motion would be decreased and self-sustained horizontal translation would no longer be possible with pitch equilibrium. Moreover, the magnitude of the pitching couples available with the long moment arm can be of great advantage for attitude and pitch control of a ducted fan vehicle. Consider for example a control surface like 15 of FIG. 1. The change of moments available are shown by curve $\Delta M_{16}$ in FIG. 7. By installing an identical surface on an identical duct but with the duct hinged as shown in FIG. 2, the change of moment available is substantially doubled due to the increase of moment arm between the axis of moments and the surface. This curve is shown as $\Delta M_{16-2}$ in FIG. 7. When referred to curve $M_2$ which is everywhere of a smaller magnitude, it is seen that the ducted fan-control surface combination now has ample control couples for pitch stability and for pitch control. We now consider the case in which this superior control system having a long arm is incorporated into one of my improved ducted fan installations in an aircraft. In this case, the pitching couples between the supporting airframe and the ducted fans become zero, and the contributions to the aircraft's net pitching couples from the ducted pitching couples are zero. In fact, the relative angular position or tilt angle of the tilting duct with respect to its supporting airframe can now be determined aerodynamically rather than mechanically by using the control surface in the slipstream. This has the advantage of not requiring a mechanical connection to fix the tilt angle of the duct with respect to its supporting frame and what is more important, it insures the absence of pitching couples from the ducted propeller to the frame by having this connection incapable of transmitting couples, i.e. a fully pivoted duct connection capable of transmitting forces but not couples. The duct is mechanically free to tilt, and with the tilt angle fixed aerodynamically by the control surface. For such an installation, the supporting airframe is provided with an attitude control system such as tail rotors or tail jets, which is quite independent of the tilt angle of the duct. As an alternate arrangement, such a connection may have a mechanism to fix the tilt angle, but that mechanism, by appropriate program of the control surface, can be designed very light as it is required to transmit only very small inertia loads, or pitch control loads produced by superposed deflection of the surface away from those prescribed by the programme. In the case of FIG. 8, the tilt position of the duct 46 about axis 45 with respect to wing 40 is provided by angular settings of surface 48 with respect to duct 46 and according to curve $M_2$ and curve of the type $\Delta M_{16}$ of FIGURE 7. Referring to the auxiliary scale for duct tilt angle shown in FIGURE 7, the approximate deflection program is as follows. For duct angle of 90 degrees, control surface is neutral; for duct angle of 80 degrees control surface is ⅔ of its maximum deflection; for duct angle of 52 degrees, control surface is about ¼ of its maximum deflection; and for duct angle of 52 degrees, the control surface is back to neutral. The direction of deflection of the surface for the program is in the same direction as that of the tilt angle as defined in FIGURE 2; the maximum deflection angle of the main control surface is of the order of 15 degrees. In top of the deflection program, there can be super-imposed to it, by the pilot if desired, additional control deflections in either direction which should be of the order of ±5 degrees.

Referring now to FIGURE 9, I show in partial top view a tilt duct arrangement of the type shown in FIGURE 5 incorporated in a delta wing for VTOL. Specifically, the figure shows a delta wing 55 having a spanwise axis 57 through the wing's aerodynamic center and a C. G. position 56. At the left wing tip, at its leading edge, there is shown a tilting duct 59 in a vertical position supported to the wing by a generally spanwise tilt axis which is adjacent to the upper intake lip portion of the duct rather than central through the duct axis. (This mode of connection is shown in greater clarity in FIGURE 10). In FIGURE 9, it can be seen that the vertical thrust 60 of the duct 59 has the same fore-and-aft location as the center of gravity 56 of the aircraft, hence in vertical flight there is not pitch disturbance. This is possible for this wing planform due to the singular advantage of the peculiar duct pivotal axis.

In the figure, there is shown fan drive and/or interconnecting shaft 58, gear box 67, shaft 64, and gear box 66; this will be shown in greater detail in FIGURE 10. The duct of FIGURE 9 can be tilted backwards from position 59, about axis 58 to final position 61 in which it is partially below the delta wing tips. In that position, there shows duct's trailing surface 62 (of the type shown say in FIGURE 17) and optional duct reinforcing arm 63. These details of FIGURE 9 can also be seen in FIGURE 10. There is shown again wing 55 with spanwise duct drive and/or interconnecting shaft 58 about which the duct is also tilted; shaft 58 engages gear box 67 and emerges 67 as connecting shaft 64 on the duct and perpendicular to shaft 58. Sshaft 64 engages gear box 66 and emerges 66 axially on the duct to drive the duct's fan. Duct 59 is pivoted with respect to wing 55 at an axis coincident with 58 and the relative position of the wing and the duct may be adjusted by any suitable mechanism for instance jack and screw mechanism 65. The duct may have a central gas turbine to provide its own thrust, and use shaft and gear system for interconnection between the tilting ducts at each wing tip to insure symmetric thrusts in the case of unsymmetric gas turbine failue. Alternately the main gas turbine may be located away from the duct and the shaft used for actuating the fans in the tilting ducts. The structures of FIGURES 9 and 10 are shown in a perspective view of a complete airplane in FIGURE 14. There is shown in the high speed position a delta wing 55 mounting tilting ducted fans 61 in the high speed position on the tips of the delta. Obviously the ducts add to the stability of the airplane since their area is to the rear of the airplane center of gravity. Additionally, simultaneous deflection of the surfaces 62 produce pitch control, and opposite deflection produce roll control.

FIGURE 11 shows a partial top view of a tilting duct of the type discussed in FIGURE 2 mounted on the flap of a swept forward wing. Specifically, there is shown swept forward wing 71 having an aerodynamic center and an aircraft center of gravity 72 immediately adjacent to each other. The wing has a trailing flap 81 shown retracted in the high speed position, the flap supports at its tip a tilting ducted fan 75 rigidly attached to the flap 81. The duct has horizontal trailing surfaces 78 which serve to vary the moments on the duct and flap, and vertical trailing surfaces 79 which serve to introduce side forces to the aircraft. The fan of the ducted fan may be driven by a spanwise shaft 77 on the flap, or by a high lift rotating cylinder 76 mounted on the flap and of the type described in my aforementioned application 48,038.

When the flap is deflected to a vertical position, then the ducted fan which is mounted on the flap is also tilted to a vertical position. The duct is shown in vertical position in dash lines 80 and it can be observed that the fore and aft location of the center of the duct is the same as that of the center of gravity 72. Therefore, in hover there is no pitch disturbance. Yet, in transition the pitch characteristics are of the improved type described in curve $M_2$ of FIGURE 7, and the swept wing planform permits very high speeds with delayed compressibility drag effects due to its sweep.

An alternate method would be to locate the ducted fans on the trailing edge of the wings.

FIGURE 12 shows a partial top view of a ducted fan of the type shown in FIGURE 3 mounted on the tip of a wing. Specifically, there is shown a wing tip 86 having a wing aerodynamic axis 85 which passes through the center of gravity of the aircraft. (The C.G. is not shown in the figure.) The figure also shows a ducted fan 93 in the horizontal high speed position. The ducted fan is connected to the wing by a generally spanwise duct tilt axis 87 located approximately at the same fore-and-aft location as that of the wing's aerodynamic axis 85, and ahead of the forward lips of the duct. As shown in the figure the duct 93 has a side ear or bracket 94 and a central gas turbine 92 which is shown schematically; the ear and the turbine case act as structural supports to hinge the duct to the wing ahead of the duct's lips. Gas turbine 92 has fan or impeller 97 and is connected to the duct by means of stators 96 and 98. The gas turbine can be interconnected to other power plants by means of axial shaft 91, gear box 90 which may be a conventional bevel gear box, shaft 89 inside fairing support 95, and wing shafting 87 which engages other turbines not shown in this figure. The duct bracket 94 has a spur gear 100 fixed to it and concentric with shaft 87. Gear 100, driven by small gear 88, controls the tilt angle of the duct. The moment characteritsics of the structure of FIGURE 12 are of the type described by curve $M_3$ of FIGURE 7; therefore, great structural improvements are possible by decreasing the torsional loads of the duct and wing. Also large improvements in the pitching moments for the aircraft throughout transition are obtained by selecting the center of gravity at or below the tilt axis of the duct.

It can be seen that in FIGURE 12 the shaft input 89 from the wing to the tilting ducted fan is located ahead of the fan 97. This location is opposite to that of standard shaft inputs into conventional ducted fans which are to the rear of the fan. Locating the shaft input ahead of the fan permits a different structural connection using my improved duct tilting axis; this feature is also shown in other figures in the drawings.

FIGURE 13 shows a rear view of a tilting duct supported by a wing in an arrangement of the general type as that shown in FIGURES 5 and 10. Specifically the figure shows a wing tip portion 105 which has a fixed bushing 107 which bushing supports tilting duct 114 by means of duct ear 108 which engages bushing 107. Concentric with bushing 107, there is shown fan drive shaft 106 in the wing which engages bevel gear box 110 on the periphery of the duct and proceeds by means of shaft 111 to engage the shaft of fan 115. Since the entire duct has a tilt axis coincident with the fan's shaft drive, obviously tilting the duct will not interrupt the fan's operation.

I will now describe in FIGURES 15, 16 and 17 embodiments of my improved tilting ducts in a peculiar VTOL transport which has a tremendous volume storage capacity. In this type of airplane the disc loading of the fans in the duct may be extremely large, thus it is very important to minimize torsional loads and improve the pitch transition characteristics. This is obtained by using my improved type of tilting ducts in the vehicle. The fuselage configuration is that of a low aspect ratio wing. It should be observed that other conventional VTOL systems like helicopter, tilt wings and deflected slipstream airplanes obviously could not have such a large fuselage and small overall dimensions as the vehicle I show. There is unique cooperation between the VTOL system and the fuselage shape for this VTOL aircraft. The importance of size and load is crucial for certain type of aircraft, for instance, VTOL airplanes that have to fit in the elevators of aircraft carriers.

Specifically in FIGURE 15 I show a side elevation of the VTOL aircraft having an airfoil shaped fuselage 120 of approximately 20% chord maximum thickness. The fuselage mounts on each side, by means of small stub wings 121, a tilting duct 123 having a central gas turbine 122, a duct tilt axis and duct interconnecting shaft 133 and duct trailing surfaces 126 and 127 to introduce respectively side forces to the aircraft and pitching moments to the duct and/or aircraft during hover and transition. Separate pitch control, air jets or tail rotors may be used for hover and transition control.

The aircraft has a center of gravity 125 below the tilt axis, a separate pilot and crew compartment 124, landing gear 128 on the fuselage, a pivoted rear fuselage portion 130 pivoted at spanwise axis 135 and which extends to the full width of the fuselage, and a loading ramp 129 which forms part of the lower floor of the fuselage. The pivoted tail section supports vertical rudders and fins as well as fixed stabilizer and elevator 134.

FIGURE 16 shows a partial top view of the aircraft of FIGURE 15. There is seen in greater clarity fuselage 120 having stub wings 121 supporting the tilting duct in the vertical position 123. The general location of tilting axis and interconnecting shaft 133 is also shown. Observe tail surface 134, central cabin 124 and landing gear 128.

FIGURE 17 shows in perspective the VTOL aircraft of FIGURES 16 and 17 but in the high speed condition with the tilting ducts in a substantial horizontal position. In this position tail 134 supplies pitch stability and control like in a conventional airplane, and surfaces 127 supply roll control. Tail 134 could be underslung below the fuselage rather than above it for high angle of attack pitch stability and controlability if desired. Also, boundary layer control must be provided on the upper portion of the fuselage by blowing, suction or more particularly by exposing the upper surface of the fan interconnection shaft to the airstream. This general type of installation is discussed in aforementioned application Serial 48,038 and will be omitted here.

Optional overall dimensions of the configuration of FIGURES 15 and 16 and overall proportions can be obtained with the aid of graphic scale of FIGURE 18, drawn to the scale of one inch equals ten feet. The uninterrupted volume storage capacity of the fuselage allowing for floor, roof, and walls of the fuselage, can be seen to be approximately 28 feet wide by 22 feet long by 7 feet high, and there is available a full-width loading door and loading ramp. Obviously, such payload as assembled helicopters and fighter aircraft, ground effect machines, radar antennas, missiles, tractors, assembled bridges, etc., can be loaded and stored without difficulty. Further, there is a wide range of lateral loading space which permits to quickly distribute the cargo for a given longitudinal position of the center of gravity. This is of particular advantage for economy of loading, safety, and rapid operation under combat conditions.

The overall span and height of the aircraft is small compared to its volume capacity, but its span and fuselage configuration is yet of sufficient magnitude to permit economic winged flight at high speeds. Such a large volume storage and latitude of loading and cargo distribution have not been obtained before for VTOL aircraft having enclosed fuselages and having satisfactory high speed drag characteristics.

The fuselage configuration shown is also adaptable as a hull for water based operation, as a ground effect machine with appropriate fuselage air supply, or as a composite aircraft-ground effect machine of large volume storage capacity.

Other characteristics and features of the fuselage shown in FIGURES 15, 16 and 17 and which have been omitted in the drawings are dorsal fins and end plates on the planes of the sides of the fuselage and a special loading door with a cutaway portion to permit the protrusion of a load to the rear of the fuselage. The cross-section of the fuselage may be reflexed with reversed curvature at its trailing edge to improve fuselage pitch stability, or may be adjusted in flight. Additional tilting propellers of this improved type or lifting jets may be installed on the fuselage to increase the lifting capacity of the vehicle.

Various further modifications and alterations from those described hereinabove can obviously be made without departing from the spirit of this invention, and the foregoing are to be considered purely as exemplary applications thereof. The actual scope of the invention is to be indicated by reference to the appended claims.

In the claims, the term "ducted fluid-transporting impeller" is employed as denoting rotatable impeller member such as conventional propeller or a fan, having a tubular duct around the periphery of the impeller; for instance, a shrouded propeller or a ducted fan.

I claim:

1. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axes and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said ducts being further characterized in that said pivotal connection is located relative to said ducts ahead of said intake lips.

2. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said aircraft being further characterized in that said wings are swept back wings, and in that said swept wings and said ducted fluid transporting impellers in said first position have an aerodynamic center substantially adjacent to said center of gravity of said aircraft.

3. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said aircraft being further characterized in that said center of gravity is slightly ahead of said aerodynamic center and in that the stabilizing and control surfaces of said aircraft are said wings and said ducted fluid transporting impellers.

4. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said aircraft being further characterized that said wings have flaps extending to said wing tips and in that said ducted fluid transporting impellers are mounted on said flaps.

5. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said aircraft being further characterized in that said wings are swept forward wings having an aerodynamic center having a fore and aft location approximately equal to the fore and aft location of said pivotal axis.

6. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said aircraft being further characterized in that when said ducted fluid transporting impellers are in their first position they have an upper lip portion and in that said pivotal axis passes through said upper lip portion.

7. An aircraft having a central portion with a longitudinal axis aligned to the normal direction of motion of said aircraft and a pair of wings extending laterally from said central portion having wing tip portions disposed in substantial symmetry with respect to said longitudinal axis; a pair of ducted fluid transporting impellers each having a duct with a fluid intake mouth with lips on said mouth, a fluid ejecting mouth and an impeller between said intake and ejection mouths having an impeller axis of rotation substantially concentric with said duct; means mounting said pair of ducted fluid transporting impellers on said wing tip portions of said wings comprising a connection having a pivotal axis generally perpendicular to said longitudinal axis and said impeller axis and located on said ducts ahead of said impeller and adjacent to said intake lips, and means provided to vary the position of each of said ducted fluid transporting impellers between a first position in which said impeller axes are substantially parallel to said longitudinal axis and a second position in which said impeller axes are inclined at a substantial angle to said longitudinal axis; said ducted fluid transporting impellers being further characterized in that said intake mouth has a diameter and in that a movable wing member having a leading edge, a trailing edge and side edges thereof is mounted on trailing brackets supported by said duct with the leading edge of said wing being located to the rear of said fluid ejecting mouth of said duct and with said movable wing positioned in a rearward projection of a longitudinal diametral plane of said duct, with the distance between said intake mouth and said movable wing member being at least as great as approximately one and two-tenths times the diameter of said duct.

8. A fluid sustained apparatus having a central body portion with a longitudinal axis parallel to the normal direction of movement of said body and a pair of ducted fluid transporting impellers each having a duct with a fluid intake mouth with lips on said mouth, a fluid ejecting mouth, and an impeller between said intake and ejecting mouths having an impeller axis of rotation substantially concentric with said duct; means mounting said pair of ducted fluid transporting impellers laterally on said fluid sustained apparatus and on opposite sides of said longitudinal axis comprising a connection having a pivotal axis generally perpendicular to said longitudinal axis and to said impeller axis; with said pivotal axis being secured to said ducted fluid transporting impellers ahead of said lips by means of brackets extending forwardly from said ducts, said ducted fluid transporting impellers being adapted to be moved with respect to said fluid sustained apparatus between a first position in which said impeller axes are substantially parallel to said longitudinal axis and a second position in which said impeller axes are substantially perpendicular to said longitudinal axis; said fluid sustained vehicle being further characterized in having a center of gravity located, when said ducted fluid transporting impellers are in their second position, adjacent to a plane which includes the impeller axis of each of said impellers and below an upper edge of said plane defined by a line between said pivotal connections.

9. A fluid sustained apparatus having a central body portion with a longitudinal axis parallel to the normal direction of movement of said body and a pair of ducted fluid transporting impellers each having a duct with a fluid intake mouth with lips on said mouth, a fluid ejecting mouth, and an impeller between said intake and ejecting mouths having an impeller axis of rotation substantially concentric with said ducts; means mounting said pair of ducted fluid transporting impellers laterally on said fluid sustained apparatus and on opposite sides of said longitudinal axis, comprising a connection having a pivotal axis generally perpendicular to said longitudinal axis and to said impeller axis; said fluid transporting impellers being further characterized in that said intake mouth has a diameter and in that a movable wing member is mounted on said duct to the rear of said fluid ejecting mouth at a distance to the rear of said fluid intake mouth at least as great as approximately the diameter of said intake mouth.

10. The structure of claim 9 further characterized in that said connection mounting said ducted propellers on said fluid sustained apparatus permits mechanical freedom of tilt of said ducts with respect to said fluid sustained apparatus and means to move said movable wing member with respect to said duct.

11. The structure of claim 9 further characterized in that said movable wing member is adapted to be moved in a direction parallel to said impeller axis, from a first position contiguous to said fluid ejecting mouth to a second position downstream from said first position.

12. The structure of claim 11 further characterized in that aerodynamic means are provided to vary the orientation of said fluid transporting impellers with respect to said vehicle comprising said wing member which in said second position is adapted to be inclined at a first angle to the fluid stream ejected by said impellers to produce a couple tending to rotate said impellers in an angular direction opposite to that of said first angle.

13. A vertical flight apparatus utilizing a tilting ducted fluid transporting impeller and having greatly reduced aerodynamic pitching moment variations due to variations of tilt angle of said ducted fluid transporting impeller comprising a central body portion with a longitudinal axis parallel to a high speed direction of movement of said apparatus and a tilting ducted fluid transporting impeller mounted on a side of said central body and having an impeller axis and a duct with a fluid intake mouth with lip portions on said mouth and a mouth's diameter; connecting means mounting said tilting ducted fluid transporting impeller on said central body portion for movement between a high speed duct position in which said impeller axis is approximately parallel to said longitudinal axis and a vertical flight position in which said impeller axis is in a vertical direction approximately perpendicular to said longitudinal axis, comprising a connection having a pivotal tilt axis approximately perpendicular to said longitudinal axis and to said impeller axis, said ducted fluid transporting impeller being further characterized in that said pivotal tilt axis is located relative to said duct in a region between a first plane passing through said lip portion of said intake mouth and a second plane parallel to said first plane and located upstream of said first plane at a distance no greater than the diameter of said intake mouth.

References Cited in the file of this patent
UNITED STATES PATENTS

| | | |
|---|---|---|
| 2,926,868 | Taylor | Mar. 1, 1960 |
| 2,926,869 | Sullivan | Mar. 1, 1960 |
| 3,054,577 | Wolf | Sept. 18, 1962 |
| 3,054,579 | Bary | Sept. 18, 1962 |